Patented July 18, 1933

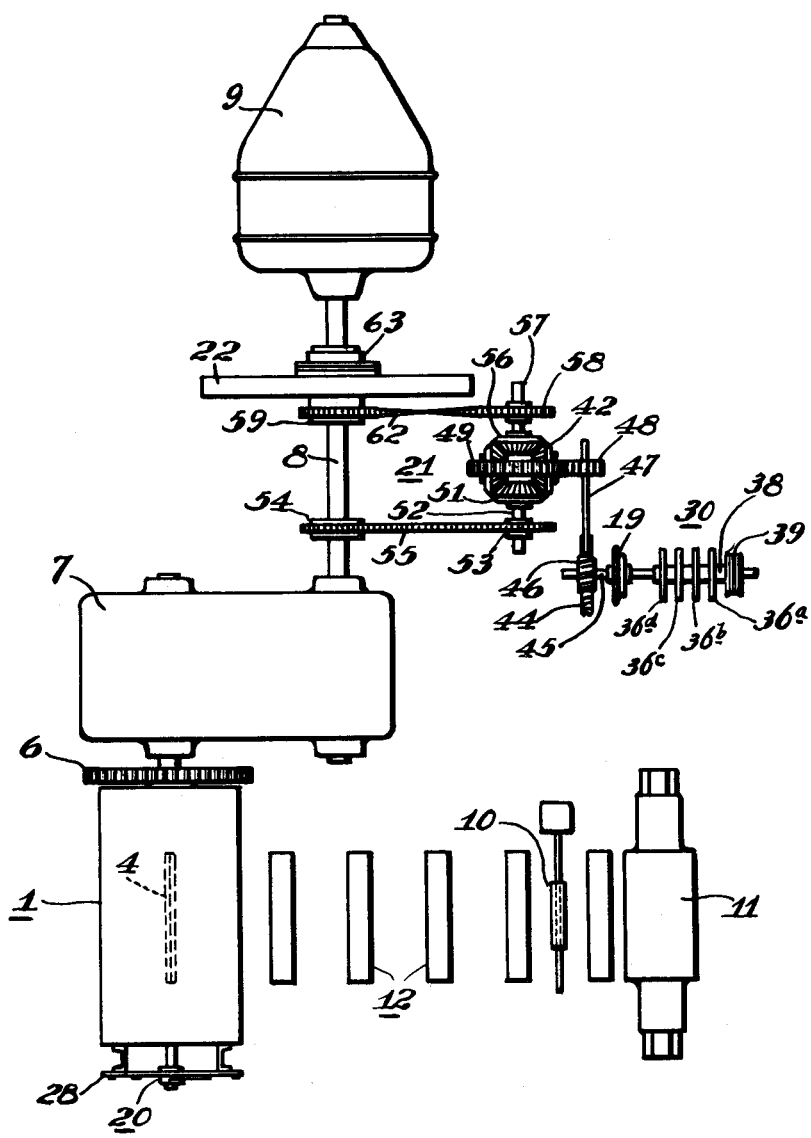

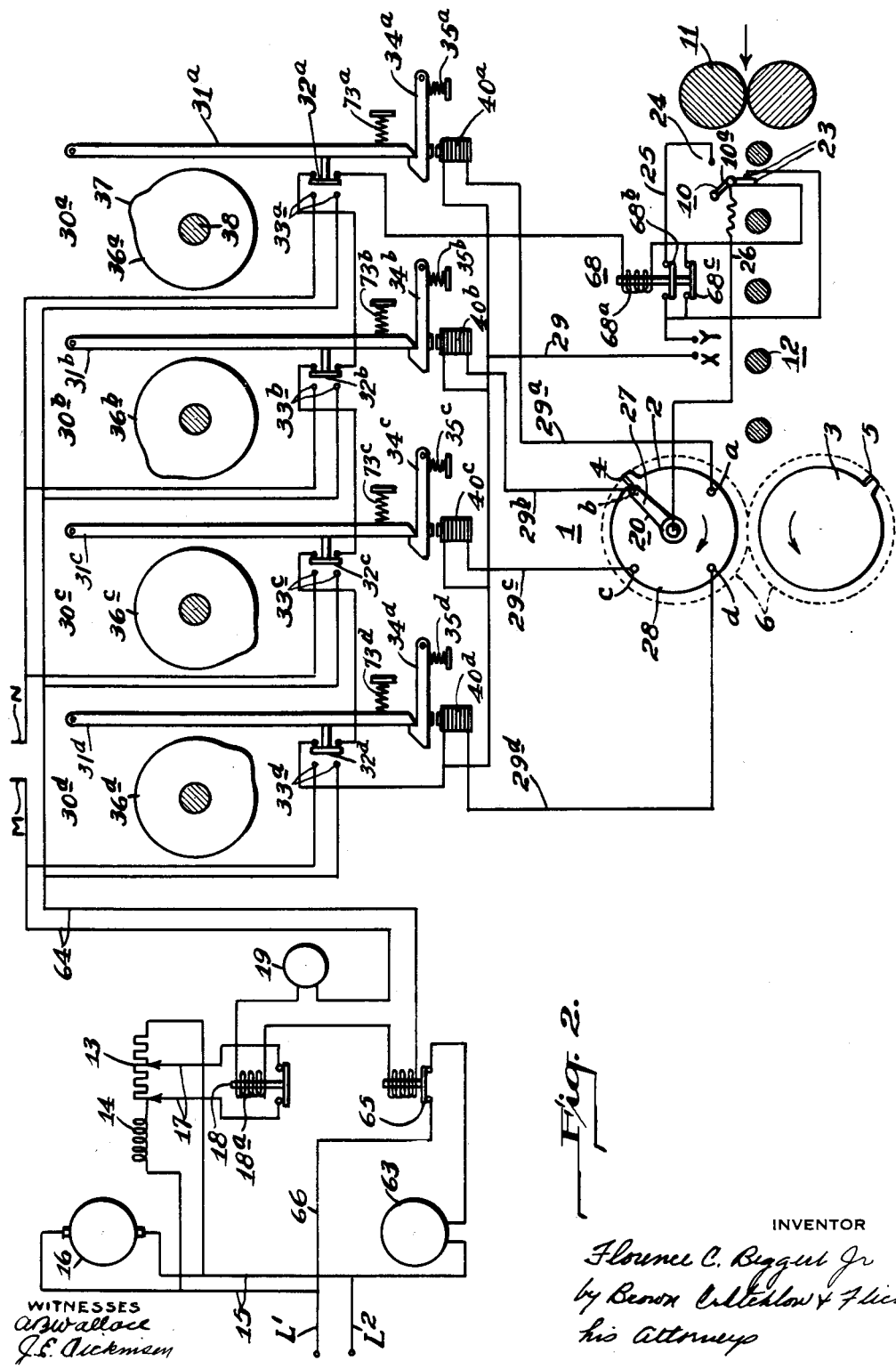

1,918,319

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

FLYING SHEAR

Application filed July 1, 1932. Serial No. 620,317.

This invention relates to flying shears, and particularly shears of the type employed for cutting metal strips, bars and the like into sections of predetermined length while in motion.

The object of the invention, generally stated, is to provide a continuously operating shear which in addition to normally producing cuts of regular preselected lengths is adapted to automatically time the cutting opposition of the blades with the advancing end of each piece of stock fed to the shear, whether at random or not, so as to perform a cropping cut of desired length or for other purposes determine the length of the first cut.

A more particular object is to provide for automatically varying the operation of a shear of this nature in response to the approach of a piece of stock in such a way as to control the length of the first cut and for so effecting such operation that it is completed before the stock reaches the shear thereby avoiding any interference with the regular cuts.

These and other objects, as well as the various other novel features and advantages of the invention, will be apparent when the following detailed description is read in conjunction with the accompanying drawings, of which Fig. 1 is a plan view of a metal shearing apparatus constructed in accordance with the invention, and Fig. 2 a schematic wiring diagram of a control system for controlling the operation of the apparatus shown in Fig. 1.

Referring to the drawings, the numeral 1 designates a flying shear which may be of any one of a number of well known forms of shears of this character although illustrated as a rotary blade type comprising a pair of blade carriers 2 and 3 equipped with cutting blades 4 and 5, respectively. For operating these continuously they are connected by suitable gears 6 to a change speed unit 7 which is in turn coupled by a drive shaft 8 with a variable speed motor 9.

In accordance with the invention this shear 1 is mounted sufficiently in front of a continuously operated feeding apparatus 11, such as a rolling mill, to permit the operation of the shear being varied enough between the time a piece of stock leaves the mill and enters the shear, to get the cutting blades of the shear in step with the leading end of the stock in a way to determine the length of the first cut. To convey the stock from the mill or whatever feeding apparatus is employed to the shear, any suitable conveyer, such as a roll table 12, may be provided.

Ordinarily stock is delivered at random to shears of this character. Consequently, unless some provision is made for varying the operation of the shear or the entrance of the stock into the shear, the first cut bears no relation to the other cuts and as a result considerable waste is incurred, especially so if the stock has a bad or crop end on it, as this will be present on the first cut and spoil the whole cut.

To overcome this difficulty in accordance with this invention provision is made for so varying the operation of the shear, as the stock is delivered to it, as to time the cutting operation of the blades with the entrance of the front end of the stock thereinto, and hence determine the amount of material removed by the first cut. To accomplish such end a variable resistor 13 is connected in series circuit relation with the field windings 14 of the driving motor in a circuit 15 which connects both them and the armature 16 of the shear motor to a source of current supply represented by line conductors $L_1$ and $L_2$. For shunting all or a portion of resistor 13 out of series relation with the field windings 14 to vary the speed of the shear motor a shunting circuit 17, including a circuit controlling magnetic switch 18, is employed, the amount of the resistor shunted by this circuit being determined by the connection of the circuit thereto which may be altered at the will of the operator, according to the time permitted for getting the shear blades in step with the front end of the stock.

To automatically control the operation of the field resistor shunting switch 18 in response to the stock as it is fed to the shear, a flag switch 10 is adjustably mounted in the path of the stock on the entrance side of the shear. Connected in series circuit relation with this flag switch is a multiple contact rotary switch 20 which is mounted on one of the shafts of the shear or in a fashion (not shown) to be driven therefrom. Cooperating with this switch is a plurality of latch switches 30. These are releasably connected by a magnetic clutch 19 to a differential 21 that is in turn connected to the drive shaft 8 of the shear and an inertia or fly wheel 22 releasably mounted on that shaft.

Referring to these control devices in detail, the flag switch 10 comprises a pivotally mounted lever 10a which is adapted to complete a circuit through a pair of back contacts 23 when it is in its normal position of rest and a circuit through itself and a forward contact 24 when it is engaged by a piece of stock. This latter contact is connected by a conductor 25 with a line conductor Y of a source of current supply represented by conductors X and Y. The lever 10a of the flag is itself connected by a conductor 26 with a rotary bridging member 27 which constitutes the moving element of the rotary switch 20 mounted on (or coupled to be driven by) the shear. Cooperating with this rotary element 27 is a contact supporting panel 28 which, while shown as a stationary disk mounted adjacent the rotary element 27, may take other forms. On it there is mounted a plurality of contact points a, b, c and d arranged at equally spaced points in a manner to be engaged at uniform intervals by the rotary member 27 as it is rotated by and in synchronism with the shear.

The purpose of the contacts a, b, c and d is to determine the extent to which the operation of the shear must be varied for the first cut and their number may be varied in accordance with the accuracy or length of the first cut desired. Preferably their number is made to equal the number obtained by dividing the longest cut to be made by the length of the cropping cut desired so that their control will be such that no first cut will exceed the desired length, even though the length of the regular cuts may be varied. Each of such contacts is connected by a conductor 29 to the actuating coil of a latch-releasing magnet 40 forming a part of each latch switch 30 associated with each contact. These magnets in turn are connected by conductor 29 with line conductor X.

To simplify the description, the associated parts and circuits of each of the latch switches, which are equal in number to the aforementioned contacts, a, b, c and d on the rotary switch 20, are given the same reference numerals, but are distinguished from each other by adding as a suffix thereto the letter of the contact on the switch 20 with which they are associated. Referring to them in detail as shown best in Fig. 2, they each comprise a pivotally suspended lever 31 provided near its lower end with a bridging member 32 on one side and a spring 73 on the other. This spring is so mounted as to constantly urge the lever and its bridging member into what may be termed its operative position where it is adapted to close a pair of contacts 33 that are included in a circuit which energizes the actuating coil 18a of the shear-motor field-resistor shunting switch 18. To releasably hold the lever 31 in an inoperative position a latch 34 is mounted at its lower end and constantly urged to engage the lever by a spring 35. For releasing this latch the aforementioned electromagnet 40 is provided, being disposed directly below the latch, and for resetting it a cam 36 is arranged directly in front of lever 31, being equipped with a knob 37 on its periphery and mounted for rotation on a shaft 38, the knob 37 being adapted to force the lever to its latched position each time the cam is rotated, and so positioned on the periphery of the cam as to open the contacts 33 closed by the bridge 32 on the lever at the instant the blades on the shear are adjusted in cutting opposition to each other. As shown, the switches 30 may be arranged in a single group and all of the cams 36a, 36b, 36c and 36d mounted on a common shaft 38.

For actuating the cam shaft 38 it is connected by the magnetic clutch 19 referred to above with the planetary section 42 of the differential unit 21. This connection is made through a worm gear 44 mounted on a stub shaft 45 connected to the magnetic clutch 19, a worm 46 meshing with worm gear 44, a shaft 47 carrying this worm, and a gear 48 also mounted on the shaft which is engaged with a gear 49 arranged to encircle the planetary section of the differential. To one of the sun gears 51 of the differential 21 a stub shaft 52 is connected and equipped with a sprocket wheel 53 which is arranged to be driven by a chain 55 mounted around it and a sprocket wheel 54 mounted on the drive shaft 8 of the shear. To the other sun gear 56 a stub shaft 57 is connected and equipped with a sprocket wheel 58 which is arranged to be driven by a chain 62 mounted around it and a sprocket wheel 59 carried on the flywheel 22 mounted on the shear drive shaft 8, the latter chain being twisted so that sun gear 56 is rotated in the opposite direction of gear 51, whereby causing the planetary section 42 to remain stationary except when the drive shaft 8 and flywheel 22 turn at different speeds.

The object of the flywheel 22 is to keep the sun gear 56 operating at the normal speed of the shear when the shear motor is being varied to get the cutting blades in step with the leading ends of the stock for the first cut. To attain this end the flywheel is releasably connected to shaft 8 by a magnetic clutch 63 which is controlled by the same circuit that controls the cam clutch 19 and the resistor shunting switch 18, and it is made with sufficient weight so that its momentum will cause it to rotate at substantially the same speed during the period when it is disconnected from the drive shaft, which is short, that it does when connected to such shaft. Hence as the sun gear 51 is coupled directly to the drive shaft it will move at the speed of that shaft when the flywheel is released while the sun gear which is connected to the flywheel will move at the normal speed of the shear, and as the speed of motor 9 is varied during that period the planetary section 42 will move an amount equal to the amount the shear is rotated relative to the flywheel. By energizing clutch 19 during this period, which is done, cams 36 are set in motion and continued in operation until the clutch circuit is broken by one of them, as will presently appear, which occurs when the shear blades are varied the desired amount to put them in step with the front end of the stock.

For returning the cam shaft 38 to an initial position of rest after each operation, a helical spring 39 is connected to its end opposite clutch 19 and a suitable stop anchor. Thus the cams are always started from rest with a definite relation to the cutting position of the shear blades.

For controlling both the magnetic clutches 19 and 63, and the field resistor shunting contactor 18, a circuit 64 is provided which receives its current from line conductors M and N. In this circuit the contacts 33a, 33b, 33c and 33d on the latch switches 30a, 30b, 30c and 30d are all connected in parallel relation to each other and in series with the actuating coil of the cam clutch 19, the actuating coil of the resistor shunting contactor 18 and the actuating coil of a contactor 65 which is employed to connect the flywheel clutch 63 to line conductors $L_1$ and $L_2$ through a circuit 66.

In practicing the invention motor 9 is normally adjusted to operate the cutting blades at a speed which will give the desired length of cut for a given stock speed, and a sufficient portion of the field resistor 13, connected thereto, is included in the shunting circuit 17 to vary the speed of the shear during the time the shunting contactor 18 is open or closed, depending on whether increased or decreased shear speed is desired, to bring the blades 4 and 5 into step with the forward end of a piece of stock between the time the flag 10 is operated and the time the cam on the latch switch responding thereto resets such switch.

In the operation of the shear, as the leading end of each piece of strip engages flag 10 on being discharged from the rolling mill or other feeding apparatus it moves the flag into engagement with contact 24, thus connecting the rotary element 27 of the rotary switch 20 to line conductor Y, the switch 68 being closed at this time. Thereafter as soon as this element engages one of the contacts a, b, c or d on the disk 28, for example the contact b, a circuit is established which extends from line conductor Y through conductor 25, flag 10 by way of contact 24, switch 20 by way of contact b, as shown in Fig. 2, the actuating coil of the electromagnet 40b which comprises a part of the latch switch 30b associated with contact b, by way of conductor 29b. With the completion of this circuit and the energizing of the electromagnet 40b, the latch 34b of the switch 30b is pulled away from the lever 31b permitting it to move forward and close its contacts 33b. With the closing of these contacts the circuit 64 is energized causing clutch 19 to close, clutch 63 to open, and contactor 18 to close. The clutch 19 in closing connects the cam shaft 38 of switches 30 to the differential. The clutch 63, in opening disconnects the flywheel 22 from the drive shaft 8, and contactor 18 in closing closes the shunt circuit 17 and causes the drive motor 9 to slow up.

With the slowing up of the shear shaft 8 when the shunt circuit 17 is closed, the gear 49 mounted on the planetary section of the differential is set in motion as the flywheel 22 continues to drive the sun gear 56 at its regular speed while shaft 8 drives the other sun gear 51 at a slower speed. Thus the cam shaft 38 and the cams 36 are set in motion. Thereafter as soon as the knob 37b on the cam 36b engages the lever 31b, it opens the contacts 33b which break the clutch circuit 64. This occurs when the shear blades have been moved ahead an amount which is equal to the distance from the contact point b to their cutting position, which is the amount the blades are back of the end of the stock to make the proper first cut when the flag is struck and is the equivalent of the distance the knob 37b must travel to open the latch switch 30b. The opening of the circuit 64 causes the shear motor field shunting circuit 17 to be opened, the flywheel clutch 63 to be engaged, and the cam shaft clutch 19 to be disengaged, and places the shear back in normal operation. The cam shaft 38 on being disengaged from the differential by the opening of the cam-shaft clutch 19 is returned to its initial position by its reset spring 39 in readiness for its next operation, and the flywheel 22 on being reconnected to the shear shaft 8 aids by its momentum in bringing the shear motor and the shear back to their normal operating speed.

To prevent more than one of the latch switches 30 being operated each time the flag switch 10 is tripped, an electromagnetic contactor 68 is provided for controlling the flow of current through the conductor 25 which is connected to the contact 24 of the flag switch 10, the bridging member 68b of this contactor being arranged to open this conductor 25 when the actuating coil 68a of the contactor is energized. To effect such control the coil 68a is connected in a circuit traced from line conductor X through a series of back contacts 32a, 32b, 32c and 32d provided on latch switches 30a, 30b, 30c and 30d which are closed when the levers 31a, 31b, 31c and 31d thereof are in their inoperative positions, the coil 68a and the back contacts 23 on the flag switch to line conductor Y. Hence, when any one of the latch switches is operated and its contacts 32, and in the present case 32b, opened, switch 68 falls open and so remains until the stock disengages the flag switch, permitting it to reclose its back contacts 23. With this arrangement, to maintain the coil 68a energized from the time the flag switch is operated by the stock until one of the latch switches is operated, a holding circuit 68c for coil 68a is provided. This is connected from the coil 68a to line conductor Y through a bridging member 68c in shunt relation with the back contacts 23 on the flag switch and hence is also opened when coil 68a is deenergized.

As will be appreciated from the foregoing, by shifting the flag switch, which is preferably mounted at or near a multiple of the length of cuts which it is desired to make, toward or away from the shear, the length of the first cut may be varied to vary the length of crop removed. On the other hand if it is desired to eliminate a short first cut altogether, the flag may be so adjusted that the blades will just miss the front end of the stock as it enters the shears thereby causing the first cut to have the same length as the subsequent cuts. This is desirable where the stock has no crop or bad portion on its end.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In combination, a flying shear, a variable speed motor for driving said shear, a drive shaft coupling said motor to said shear, an inertia wheel mounted loosely upon said shaft, means for releasably connecting said wheel to the shaft, means for feeding stock at a uniform speed to said shear, means for varying the speed of said shear motor, means arranged at a preselected distance from said shear to be operated by the leading end of a piece of stock fed thereto by said feeding means for disconnecting said inertia wheel from said shaft and placing said motor speed varying means in operation, and means operated jointly by said fly wheel and said shear shaft for rendering said motor varying means inoperative and reconnecting the inertia wheel to said shaft.

2. In combination a flying shear provided with cooperating cutting blades, means for feeding stock into the shear at a uniform speed, means arranged at a selected point in front of said shear in the path of travel of the stock to be operated by each piece of stock as it is delivered to the shear, means operated by the shear but energized by said stock-operated means for indicating the position of said cutting blades at the instant said stock-operated means is actuated, a variable speed motor operably coupled to said shear, an inertia means releasably connected to said motor, means for varying the speed of the motor, means actuated by said blade-indicating means for placing said motor speed-varying means in operation, and means responsive to said inertia member, and the shear itself for taking said speed-varying means out of operation.

3. In combination a flying shear provided with cooperating cutting blades, means for feeding stock into the shear at a uniform speed, means arranged at a selected point in front of said shear in the path of travel of the stock to be operated by each piece of stock as it is delivered to the shear, means actuated by the shear but renderably operable by said stock-operated means for indicating the position of said cutting blades at the instant said stock-operated means is engaged by the stock, a variable speed motor operably coupled to said shear, means for varying the speed of the motor, means actuated by said blade-indicating means for placing said motor speed-varying means in operation, and means for measuring the distance different than normal which the cutting blades travel when said speed-varying means is in operation, and means responsive to said last mentioned means for taking said speed-varying means out of operation.

4. In combination a flying shear provided with cooperating cutting blades, a variable speed motor operably coupled to said shear, means for varying the speed of said motor, an inertia wheel releasably connected to said motor, means for feeding stock into said shear at a uniform speed, means disposed at a selected point in front of said shear in the path of travel of the stock to be engaged by the leading end of each piece of stock delivered to the shear, means operated by said shear cooperating with said stock-operated means for indicating the relative position of said cutting blades with respect to their cutting position at the instant the front end of a piece of stock engages said stock-operated means, means responsive to said blade-indicating means for releasing said inertia wheel and setting said motor speed-varying means in operation, and means responsive to the relative movement of said inertia wheel and said shear for taking said speed-varying means out of operation and reconnecting said inertia wheel to said motor.

5. In combination a flying shear provided with cooperating cutting blades, a variable speed motor operably coupled to said shear, means for varying the speed of said motor, an inertia wheel releasably connected to said motor, means for feeding stock into said shear at a uniform speed, means disposed at a selected point in front of said shear in the path of travel of the stock to be engaged by the leading end of each piece of stock delivered to the shear, means responsive to said stock-operated means for indicating the relative position of said cutting blades with respect to their cutting position when said stock-operated means is engaged by the front end of a piece of stock, means responsive to said blade-indicating means for releasing said inertia wheel from said motor and setting said motor speed-varying means in operation, a differential gear unit connected to said inertia wheel and said shear, and means operated by said differential gear unit in response to the relative movement of said shear and inertia wheel for taking said speed-varying means out of operation and reconnecting the inertia wheel to the motor.

6. In combination a flying shear provided with cooperating cutting blades, a variable speed motor operably coupled to said shear, means for varying the speed of said motor, an inertia wheel releasably connected to said motor, means for feeding stock into said shear at a uniform speed, means disposed at a selected point in front of said shear in the path of travel of the stock to be engaged by the leading end of each piece of stock delivered to the shear, means actuated by said shear but rendered operable by said stock-operated means for indicating the relative position of said cutting blades with respect to their cutting position at the instant the front end of a piece of stock engages said stock-operated means, means responsive to said blade-indicating means for releasing said inertia wheel and setting said motor speed-varying means in operation, a differential gear unit coupled to said inertia wheel and said shear adapted to measure the relative movement of said shear and inertia wheel, and a set of cams timed with said blade-indicating means and releasably coupled to said differential for disconnecting said speed-varying means and reconnecting said inertia wheel to said motor when rotated a selected distance by said differential.

7. In combination a flying shear provided with cooperating cutting blades, means for feeding stock to said shear at a uniform speed, a variable speed motor for driving said shear and adapted to normally operate at a uniform speed a drive shaft connecting said motor to said shear, a speed-changing unit interposed in said shaft, a fly wheel loosely mounted on said shaft, a clutch for connecting said wheel to the shaft, means for varying the speed of said shear motor, a plurality of switches for controlling the operation of said speed-varying means and said fly wheel clutch, a latch associated with each of said switches for normally holding them in an inoperative position, an electromagnet associated with each of said latches for releasing said switches, a plurality of cams mounted adjacent to said latch switches for resetting them, a differential unit comprising oppositely disposed sun gears, and intermediary planetary gears mounted in a movable support, means connecting one of said sun gears to said shear drive shaft, means connecting the other sun gear to said fly wheel, means for transmitting the movement of said planetary gear support produced when said sun gears are operated at different speeds to said cams, a clutch for releasing said cams from said gear support, means for returning said cams to a given position of rest when they are disconnected from the differential, a flag switch adjustably mounted in the path of the stock at a distance from said shear, a rotary switch driven by said shear and electrically connected to said flag switch, said switch comprising a stationary support, a plurality of angularly spaced contacts mounted on said support, and a rotary bridging member arranged to engage said contacts and be driven by said shears in synchronism with the cutting blades thereof, a plurality of circuits connecting said contacts to the electromagnets associated with said latch switches, and means for preventing more than one of said latch switches operating when a piece of stock is passed through the shear, the cams associated with said latch switches being adapted to maintain said fly wheel clutch, said cam clutch and said speed-varying means energized until the travel of the shear blades has been altered sufficiently to get them in step with the end of the stock.

8. In combination, a flying shear, equipped with cooperating cutting blades, a variable speed motor for driving said shear, means for feeding stock to the shear, means for indicating the extent to which the leading end of a piece of stock fed at random to the shear is out of step with the cutting blades of the shear as it approaches the shear, means for varying the speed of the shear motor and shear to determine the length of the first cut, means coupled to said shear and to a power element driven at substantially the normal speed of the shear for controlling the operation of said speed-varying means to get the shear blades in step with the front end of the stock, and means responsive to said stock-indicating means for setting said speed-varying means in motion.

FLORENCE C. BIGGERT, Jr.